(12) United States Patent
Shi

(10) Patent No.: US 11,479,493 B2
(45) Date of Patent: Oct. 25, 2022

(54) AUTOMATIC CONSTANT-TEMPERATURE DEHUMIDIFICATION DEVICE

(71) Applicant: Guangzhou Shincci Energy Equipment Co., Ltd, Guangdong (CN)

(72) Inventor: Zengkuang Shi, Guangdong (CN)

( * ) Notice: Subject to any disclaimer, the term of this patent is extended or adjusted under 35 U.S.C. 154(b) by 757 days.

(21) Appl. No.: 16/465,154

(22) PCT Filed: Dec. 25, 2017

(86) PCT No.: PCT/CN2017/118407
§ 371 (c)(1),
(2) Date: May 30, 2019

(87) PCT Pub. No.: WO2018/121486
PCT Pub. Date: Jul. 5, 2018

(65) Prior Publication Data
US 2021/0284561 A1 Sep. 16, 2021

(30) Foreign Application Priority Data
Dec. 29, 2016 (CN) .......................... 201611252091.3

(51) Int. Cl.
F25B 39/04 (2006.01)
F25B 43/00 (2006.01)
F26B 21/00 (2006.01)
F26B 25/06 (2006.01)
C02F 11/13 (2019.01)
F25B 6/02 (2006.01)
F25B 30/02 (2006.01)
C02F 11/123 (2019.01)

(52) U.S. Cl.
CPC ................ *C02F 11/13* (2019.01); *F25B 6/02* (2013.01); *F25B 30/02* (2013.01); *F25B 39/04* (2013.01); *F25B 43/003* (2013.01); *F26B 21/001* (2013.01); *F26B 21/003* (2013.01); *F26B 25/06* (2013.01); *C02F 11/123* (2013.01)

(58) Field of Classification Search
None
See application file for complete search history.

*Primary Examiner* — Magali P Slawski
*Assistant Examiner* — Brad Gordon
(74) *Attorney, Agent, or Firm* — Prakash Nama; Global IP Services, PLLC

(57) ABSTRACT

An automatic constant-temperature dehumidification device, comprising at least two dehumidification heat pump assemblies having two refrigerant modules and an air module. The refrigerant module comprises a primary refrigerating module and a secondary refrigerating module, the primary refrigerating module and the secondary refrigerating module each comprising a condenser, an evaporator and a compressor. An air inlet pipe of the air module is connected to a hot side of a heat regenerator, the hot side of the heat regenerator is connected to the evaporators through ventilation pipes, the evaporators are connected to a cold side of the heat regenerator through ventilation pipes, and the cold side of the heat regenerator is connected to one of the condensers through a ventilation pipe.

17 Claims, 5 Drawing Sheets

AUTOMATIC CONSTANT-TEMPERATURE DEHUMIDIFICATION DEVICE

BACKGROUND OF THE INVENTION

The present invention relates to the technical field of drying apparatus, and more specifically relates to an automatic constant-temperature dehumidification device.

Nowadays, a commonly used drying system for sludge is operated mainly by means of a rotating drum that achieves direct drying, multiple platforms, a rotating disc or a fluidized bed. Yet, belt drying has now received greater attention and has a very good potential for growth in the market due to its strong adaptability to wet sludge, lesser parts that have to be maintained, longer service life and lower drying temperature. Belt drying of sludge that makes use of heat pump dehumidification together with mesh belt sludge drying has become a new trend in the market due to its great advantages on energy conservation and environmental friendliness etc. Heat pump dehumidification in sludge drying technology is going to dominate belt drying of sludge.

A current heat pump for drying and dehumidification of sludge has the following deficiencies:

1. Extra operation cost due to the need of cooling by means of external air or water-cooling by means f a surface cooler to, achieve temperature adjustment during the drying process.
2. Leakage of hot air and also bad smells that affect the peripheral environment if cooling is achieved by external air.
3. Failure to meet different requirements for air volume at different drying, stages during the drying process of the sludge.
4. Failure to meet different requirements for temperature and humidity at different drying stages during the drying process of the sludge.
5. Failure to meet the requirements for a modular structure due to occupation of large surface area and also a large space required for maintenance.

BRIEF SUMMARY OF THE INVENTION

In view of the aforesaid disadvantages now present in the prior art, the present invention, provides an automatic constant-temperature dehumidification device that is structurally compact, free of leakage of bad smells, occupies small floor spaces, and has a short processing cycle, and which also does not require cooling by means of external air or other cooling sources.

In order to achieve the above objects, the present invention provides an automatic constant-temperature dehumidification device comprising at least two sets of dehumidifying heat pump assemblies; the two sets of dehumidifying heat pump assemblies comprise two refrigerant modules and an air module; each of the two refrigerant modules comprises a primary refrigeration module and a secondary refrigeration module; each of the primary refrigeration module and the secondary refrigeration module comprises a condenser, an evaporator, and a compressor; in each of primary refrigeration module and the secondary refrigeration module of each of the two refrigerant modules, an outlet of the compressor is connected to an inlet of the corresponding condenser, an outlet of the condenser is connected to an inlet of the corresponding evaporator via an expansion valve, and an outlet of the evaporator is connected to the compressor; an air inlet duct of the air module is connected to a hot side of a corresponding regenerator disposed at each of the two refrigerant modules; the hot side of each regenerator is connected with the evaporator of the primary refrigeration module and the evaporator of the secondary refrigeration module of a corresponding refrigerant module via ventilation ducts; the evaporator of the primary refrigeration module and the evaporator of the secondary refrigeration module of each refrigerant module are also connected to a cold side of a corresponding regenerator disposed at a corresponding refrigerant module via ventilation ducts; the cold side of each regenerator is also connected with the condenser of the secondary refrigeration module of a corresponding refrigerant module via ventilation ducts; air coming out of the condenser of the secondary refrigeration module of each refrigerant module is guided to an air supply port.

The condenser of the primary refrigeration module of a first refrigerant module of the two refrigerant modules is a water condenser.

The condenser of the primary refrigeration module of a second refrigerant module of the two refrigerant modules is an air condenser.

The condenser of the primary refrigeration module of a second refrigerant module of the two refrigerant modules is provided with circulation fans for cooling by air and heat dissipation.

A heat exchanger is provided between each evaporator and each corresponding compressor.

A filter is provided between each heat exchanger and the corresponding expansion valve.

The two sets of dehumidifying heat pump assemblies are disposed inside an insulated housing, and are respectively located at two sides of the insulated housing; an air mixing chamber and a drying chamber separated by a partition are disposed inside the heat insulating housing.

The two regenerators are disposed in the middle of the insulated housing; the air mixing chamber is defined between the two regenerators.

A primary evaporator and a secondary evaporator being the evaporator of the primary refrigeration module of the first refrigerant module and the evaporator of the secondary refrigeration module of the first refrigerant module respectively are provided on one of two sides of a lower portion of the air mixing chamber; and another primary evaporator and another secondary evaporator being the evaporator of the primary refrigeration module of the second refrigerant module and the evaporator of the secondary refrigeration module of the second refrigerant module respectively are provided on another one of the two sides of a lower portion of the air mixing chamber.

Air filters each being corresponding to a corresponding set of the two sets of dehumidifying heat pump assemblies are disposed on the insulated housing: an upper filter is disposed on each of the air filters.

The present invention has the following beneficial effects compared with the prior arts: The present invention has self-balance temperature control, and does not require external air or other cooling sources for cooling. By means of direct discharge to the external environment (cooling), a sealed drying process can be achieved, and there is no leakage of bad smells during the sludge drying process, and therefore it is not necessary to provide a deodorizing device. By separating circulation air volume and dehumidification air volume, the circulation air volume when separated from dehumidification air volume meets the requirements for high air volume in the early stage of wet sludge drying. The dehumidification air volume meets the requirements for high temperature and low humidity in the later stage of sludge drying. Such configurations to meet the air volume, air temperature and humidity requirements in different drying stages of sludge can shorten the sludge, drying cycle and prevent dried dust of sludge.

DETAILED DESCRIPTION OF THE INVENTION

The present invention is further described in detail below with reference to the accompanying drawings and a few embodiments.

Embodiment 1

Figure 1:
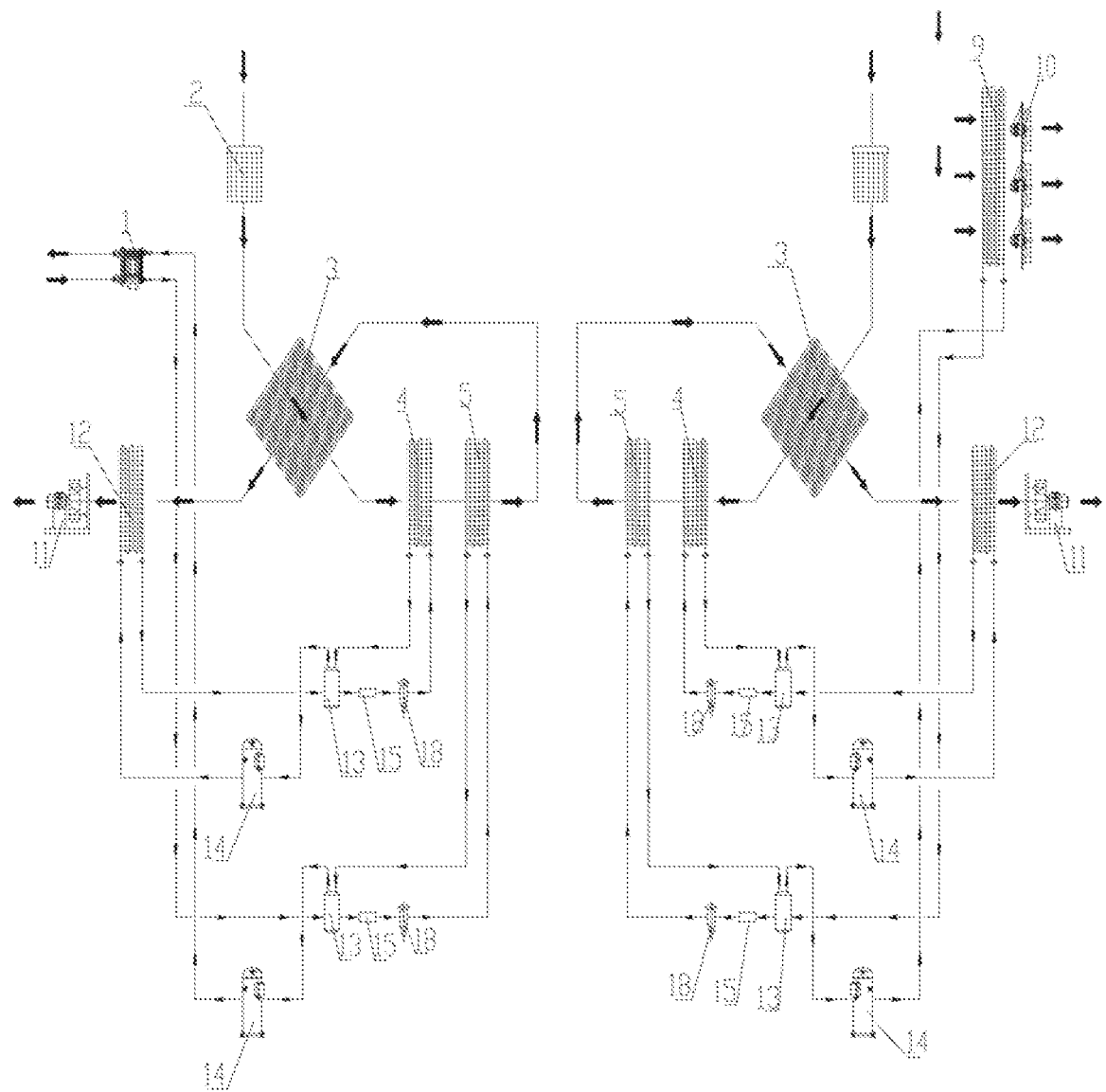
FIG. 1 is a flow diagram illustrating a principle of the automatic constant-temperature dehumidification device according to a first embodiment.
Figure 2:
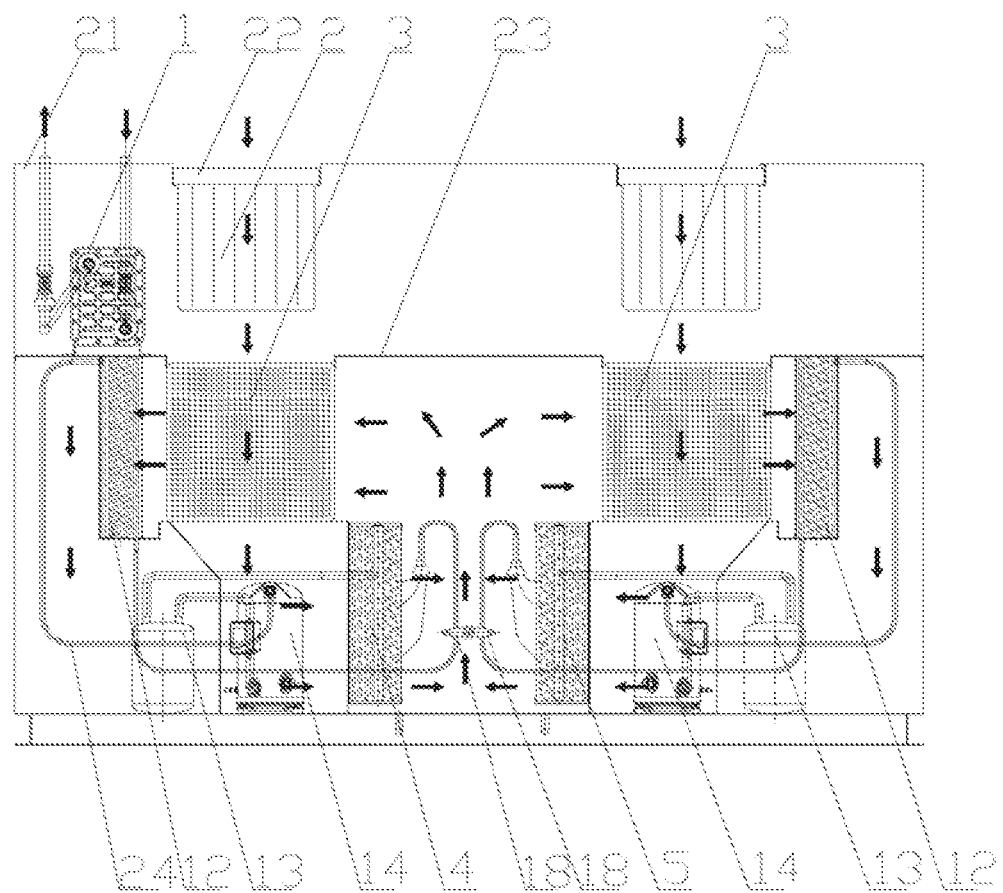
FIG. 2 is a first schematic illustration of air flow in the automatic constant-temperature dehumidification device according to a first embodiment.
Figure 3:
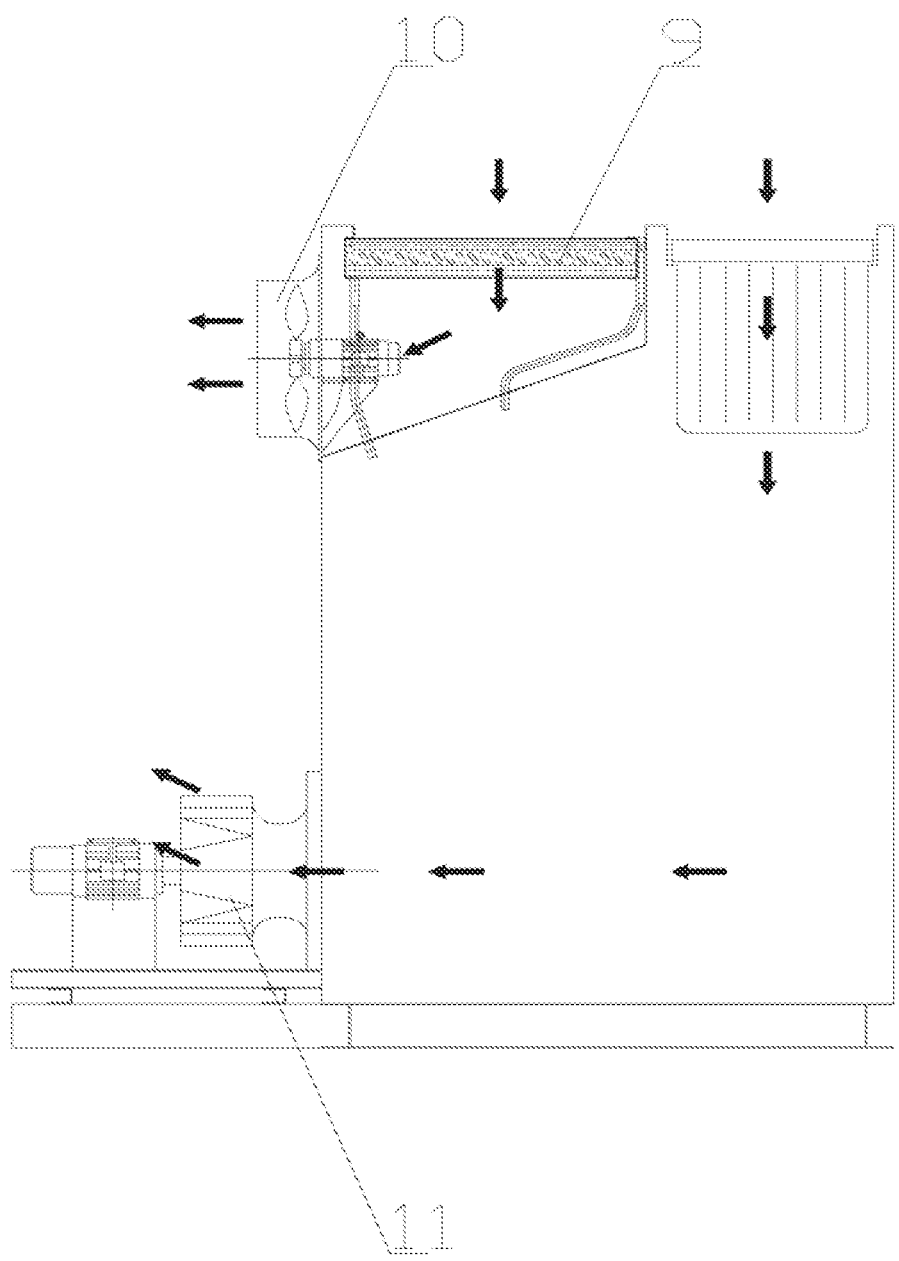
FIG. 3 is a second schematic illustration of air flow in the automatic constant-temperature dehumidification device according to a first embodiment.

As shown in FIGS. 1-3, the automatic constant-temperature dehumidification device comprises at least two sets of dehumidifying heat pump assemblies; the two sets of dehumidifying heat pump assemblies comprise two refrigerant modules (a first refrigerant module and a second refrigerant module) and an air module; the first refrigerant module comprises a primary refrigeration module and a secondary refrigeration module; the primary refrigeration module comprises a water condenser 1, a primary evaporator 5, and a compressor 14; an outlet of the compressor 14 is connected to an inlet of the water condenser 1, and an outlet of the water condenser 1 is connected to an inlet of the primary evaporator 5 via an expansion valve 18; an outlet of the primary evaporator 5 is connected to the compressor 14; the secondary refrigeration module comprises a secondary condenser 12, a secondary evaporator 4 and also a compressor 14; an outlet of the compressor 14 of the secondary refrigeration module is connected to an inlet of the secondary condenser 12, an outlet of the secondary condenser 12 is connected to an inlet of the secondary evaporator 4 via also an expansion valve 18; an outlet of the secondary evaporator 4 is connected to the compressor 14 of the secondary refrigeration module; an air inlet duct of the air module is connected to a hot side of regenerator 3 via an air filter 2; the hot side of the regenerator 3 is connected with the primary evaporator 5 and the secondary evaporator 4 via ventilation ducts; the primary evaporator 5 and the secondary evaporator 4 are also connected to a cold side of the regenerator 3 via ventilation ducts; the cold side of the regenerator 3 is also connected with the secondary condenser 12 via ventilation ducts; air coming out of the secondary condenser 12 is guided to an air supply port, and the air supply port is provided with a blower 11. A heat exchanger 13 is connected between the primary evaporator 5 and the compressor 14 of the primary refrigeration module; another heat exchanger 13 is also connected between the secondary evaporator 4 and the compressor 14 of the secondary refrigeration module. A filter 15 is disposed between each heat exchanger 13 and the corresponding expansion valve 18.

The second refrigerant module comprises a primary refrigeration module and a secondary refrigeration module; the primary refrigeration module comprises an air condenser 9, a primary evaporator 5, and a compressor 14; an outlet of the compressor 14 is connected with an inlet of the air condenser 9, an outlet of the air condenser 9 is connected to an inlet of the primary evaporator 5 via an expansion valve 18; an outlet of the primary evaporator 5 is connected to the compressor 14; the secondary refrigeration module comprises a secondary condenser 12, a secondary evaporator 4, and also a compressor 14; an outlet of the compressor 14 of the secondary refrigeration module of the second refrigerant module is connected to an inlet of the secondary condenser 12; an outlet of the secondary condenser 12 is connected to an inlet of the secondary evaporator 4 also vie an expansion valve 18; an outlet of the secondary evaporator 4 is connected to the compressor 14; an air inlet duct of the air module is connected to a hot side of a regenerator 3 via an air filter 2; the hot side of the regenerator 3 is also connected with the primary evaporator 5 and the secondary evaporator 4 via ventilation ducts; the primary evaporator 5 and the secondary evaporator 4 are also connected with a cold side of the regenerator 3 via ventilation ducts; and the cold side of the regenerator 3 is connected to the secondary condenser 12 also via ventilation ducts; air coming out of the secondary condenser 12 is guided to an air supply port; the air supply port is provided with a blower 11; a heat exchanger 13 is connected between the primary evaporator 5 and the compressor 14 of the primary refrigeration module; another heat exchanger 13 is also connected between the secondary evaporator 4 and the compressor 14 of the secondary refrigeration module; a filter 15 is disposed between each heat exchanger 13 (energy saver) and the corresponding expansion valve 18. A group of air circulation fans 10 is disposed on the air condenser 9 for heat dissipation. The two sets of dehumidifying heat pump assemblies are disposed inside an insulated housing 21, and are respectively located at two sides of the insulated housing 21; an air mixing chamber and a drying chamber separated by a partition 23 are disposed inside the heat insulating housing 21. The air mixing chamber and the drying chamber are directly separated by the partition 23. Preferably, the two regenerators 3 are disposed in the middle of the insulated housing 21; the air mixing chamber is defined between the two regenerators 3, the primary evaporators 5 and the secondary evaporators 4 of the first refrigerant module and the second refrigerant module are respectively provided on each of two sides of a lower portion of the air mixing chamber. The water condenser 1 and the air condenser 9 are respectively located at two sides of a central portion of the insulated casing 21. The air filters 2 corresponding to the respective dehumidifying heat pump assemblies are disposed on the insulated casing 21; an upper filter 22 is disposed on each of the air filters 2.

Operating Principles:

Explanation of the Flow of Refrigerants (Refrigerants Includes Inorganic Compounds, Fluoride Pure Substances, Hydrocarbons or Mixed Refrigerants)

3.1.2.1 1 #(—of First Refrigerant Module) Flow of Primary Refrigerant in the Primary Refrigeration Module 1#compressor $\xrightarrow{\text{superheated air of high temperature and high pressure}}$ -continued

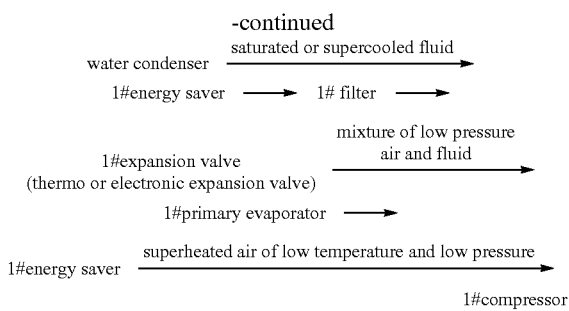

3.1.2.2 1 #Flow of Secondary Refrigerant in the Secondary Refrigeration Module

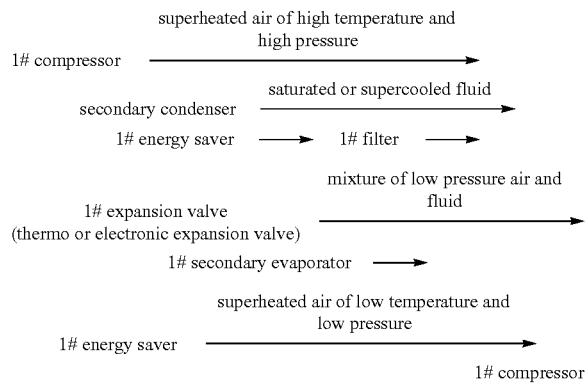

3.1.2.3 2 #(— of Second Refrigerant Module) Flow of Primary Refrigerant in the Primary Refrigeration Module

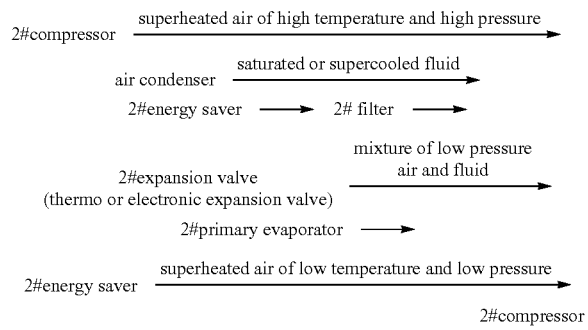

3.1.2.4 2 #Flow of Secondary Refrigerant in the Secondary Refrigeration Module

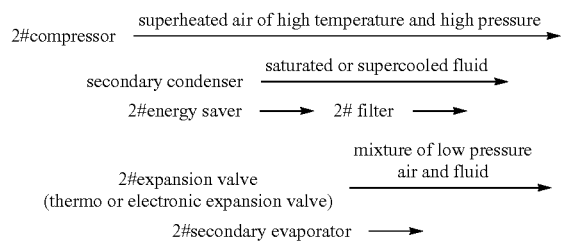

-continued

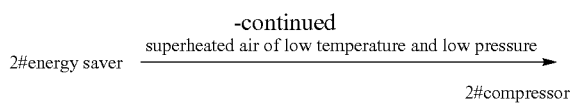

Explanation of the Flow of Cooling Water (from Cooling Tower or Other Cooling Sources)

Cooling source (e.g. cooling tower)→cooling water-→cooling water ducts→waiter condenser→cooling water ducts→cooling source 3.2.1.1 1 #(—of First Refrigerant Module) Air Flow Dehumidifying air circulation: return air of the drying chamber→first air filter→second air filter→1 #the hot side of the regenerator→1 #primary evaporator→1 #secondary evaporator→1 #the cold, side of the regenerator→1 #secondary condenser→1 #blower→drying chamber 3.2.1.2 2 #(—of Second Refrigerant Module) Air Flow Dehumidifying air circulation: return air of the drying chamber→first air filter→second air filter→1 #the hot side of the regenerator→1 #primary evaporator→1 #secondary evaporator→1 #the cold side of the regenerator→1 #secondary condenser→1 #blower→drying chamber Circulation of circulating air: return air of the drying chamber→2 #air condenser→circulation fans→drying chamber 3.2.1.3 Flow of Drying Agent (e.g. Air)

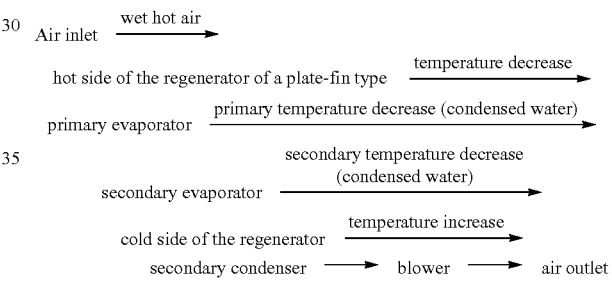

Embodiment 2

Figure 4:
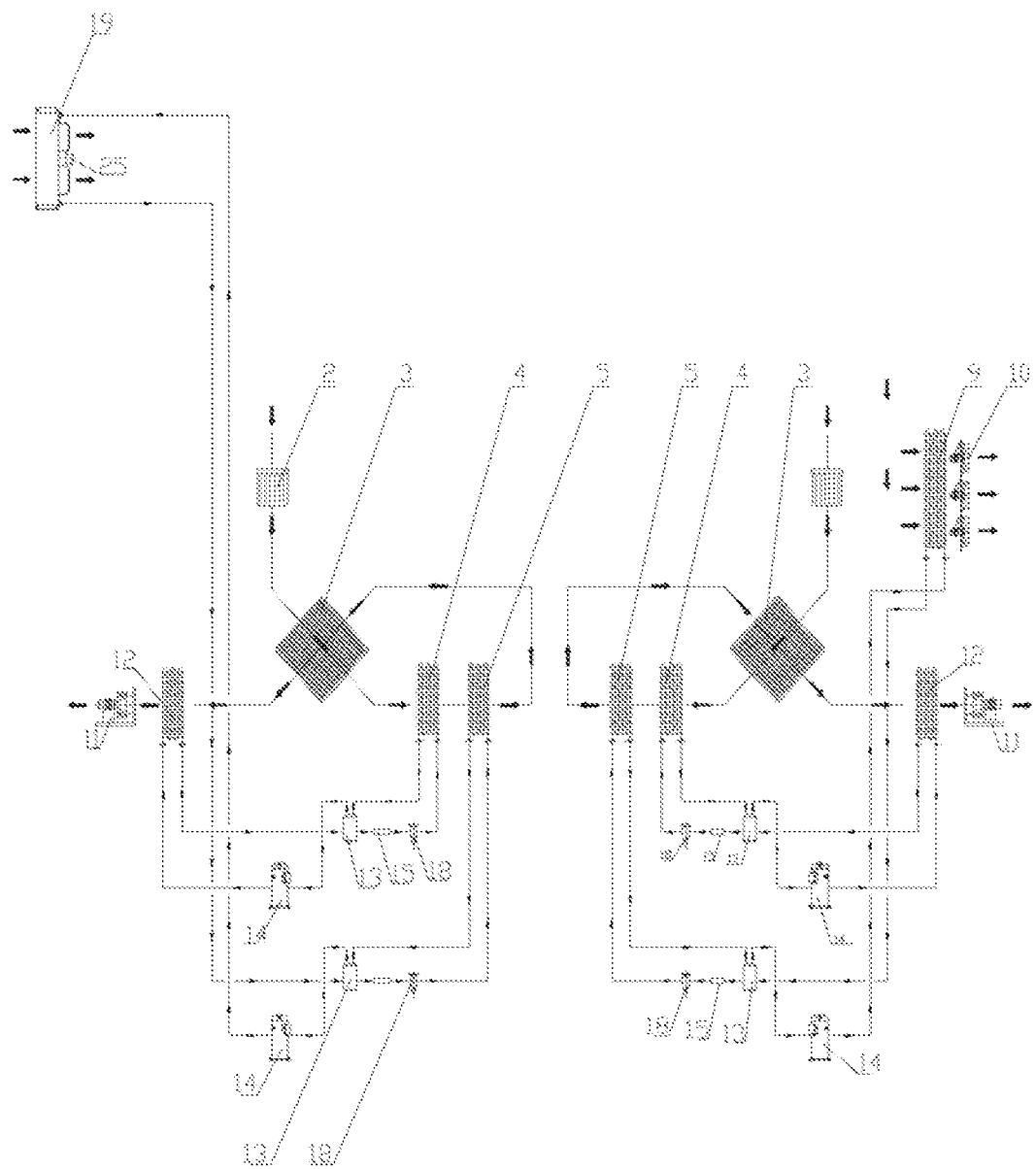
FIG. 4 is a flow diagram illustrating a principle of the automatic constant-temperature dehumidification device according to a second embodiment.
Figure 5:
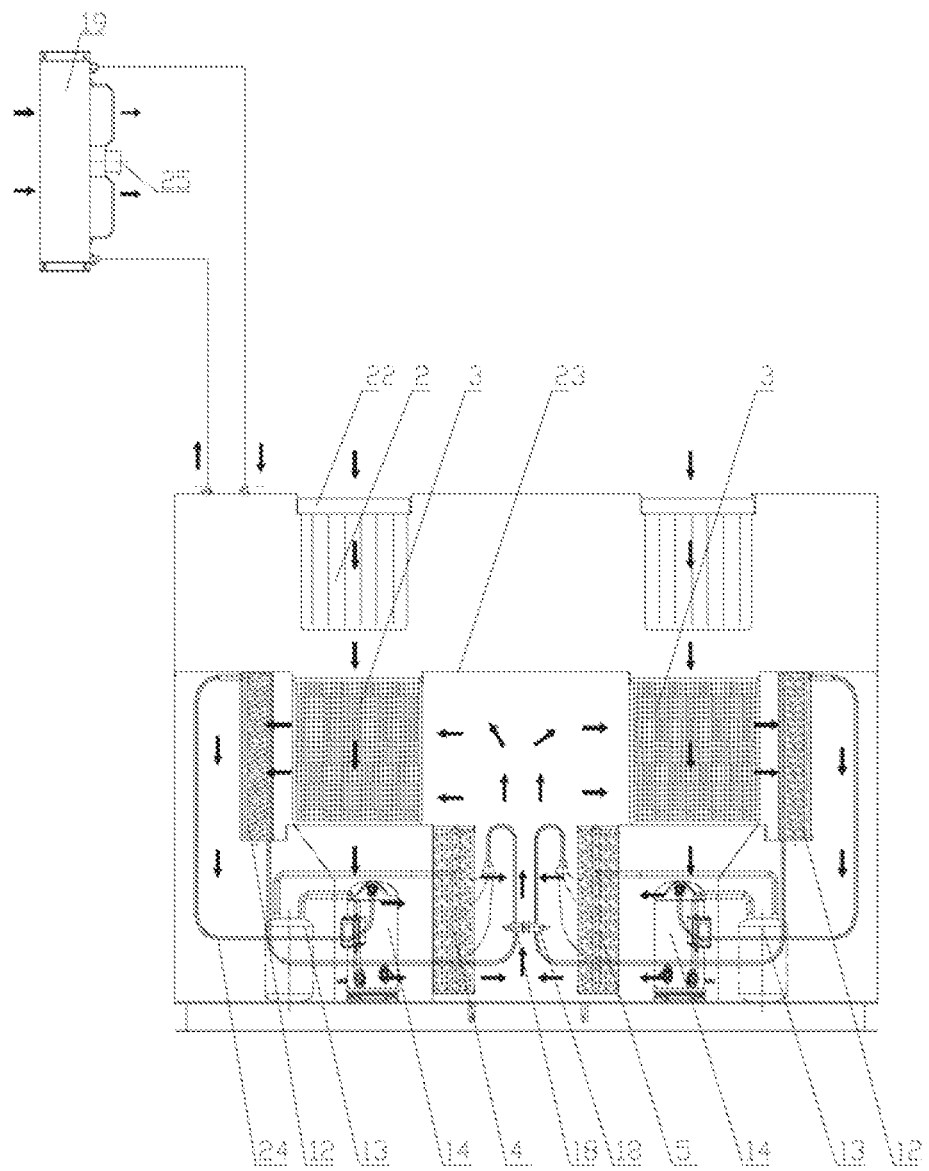
FIG. 5 is a schematic illustration of air flow in the automatic constant-temperature dehumidification device according to a second embodiment.

As shown in FIGS. 4-5, the automatic constant-temperature dehumidification device comprises at least two sets of dehumidifying heat pump assemblies; the two sets of dehumidifying heat pump assemblies comprise two refrigerant modules (a first refrigerant module and a second refrigerant module) and an air module; each of the first refrigerant module and the second refrigerant module comprises a primary refrigeration module and a secondary refrigeration module; the primary refrigeration module comprises an air condenser 19, a primary evaporator 5, and a compressor 14; an outlet of the compressor 14 is connected to an, inlet of the air condenser 19, and an outlet of the air condenser 19 is connected to an inlet of the primary evaporator 5 via an expansion valve 18; an outlet of the primary evaporator 5 is connected to the compressor 14; the secondary refrigeration module comprises a secondary condenser 12, a secondary evaporator 4 and also a compressor 14; an outlet of the compressor 14 of the secondary refrigeration module is connected to an inlet of the secondary condenser 12, an outlet of the secondary condenser 12 is connected to an inlet of the secondary evaporator 4 via also an expansion valve 18; an outlet of the secondary evaporator 4 is connected to the compressor 14 of the secondary refrigeration module; an air inlet duct of the air module is connected to a hot side of a regenerator 3 via an air filter 2; the hot side of the regenerator 3 is connected with the primary evaporator 5 and the secondary evaporator 4 via ventilation ducts; the primary evaporator 5 and the secondary evaporator 4 are also, connected to a cold side of the regenerator 3 via ventilation ducts; the cold side of the regenerator 3 is also connected with the secondary condenser 12 via ventilation ducts; air coming out of the secondary condenser 12 is guided to an air supply port, and the air supply port is provided with a blower 11. A heat exchanger 13 (energy saver) is connected between the primary evaporator 5 and the compressor 14 of the primary refrigeration module; another heat exchanger 13 is also connected between the secondary evaporator 4 and the compressor 14 of the secondary refrigeration module. A filter 15 is disposed between each heat exchanger 13 and the corresponding expansion valve 18. In one of the two sets of dehumidifying heat pump assemblies, a group of circulation fans 10 are provided on the air condenser 19 for heat dissipation. A heat dissipation blower 25 is provided on the air condenser 19.

Explanation of the Flow of Refrigerants (Refrigerants Includes Inorganic Compounds Fluoride Pure Substances, Hydrocarbons or Mixed Refrigerants)

3.2.2.1 1 #(—of First Refrigerant Module) Flow of Primary Refrigerant in the Primary Refrigeration Module

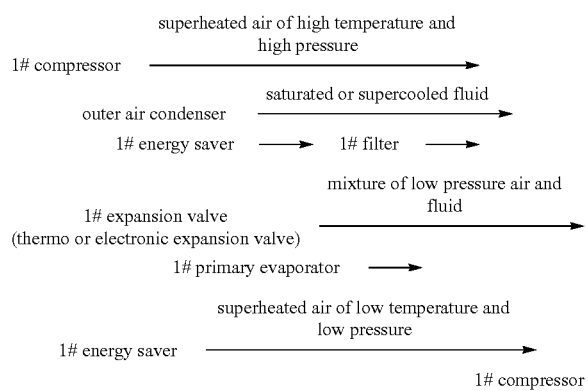

3.2.2.2 1 #Flow of Secondary Refrigerant in the Secondary Refrigeration Module

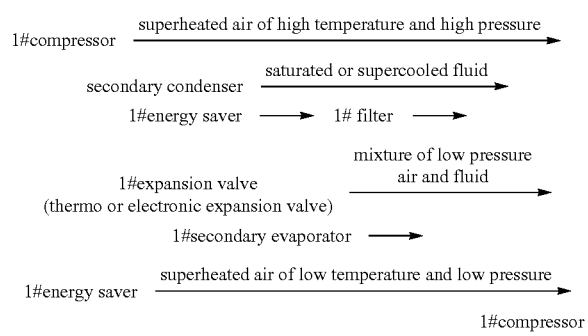

3.2.2.3 2 #(—of Second Refrigerant Module) Flow of Primary Refrigerant in the Primary Refrigeration Module

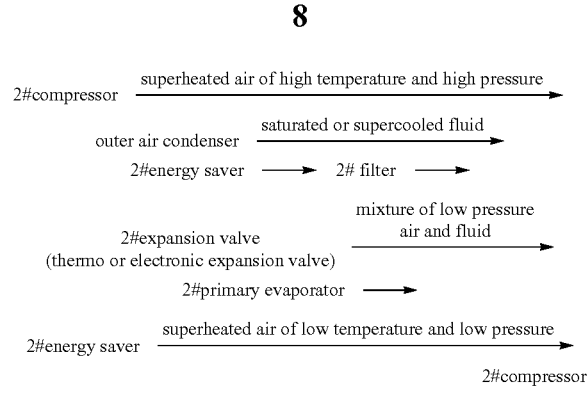

3.2.2.4 2 #Flow of Secondary Refrigerant in the Secondary Refrigeration Module

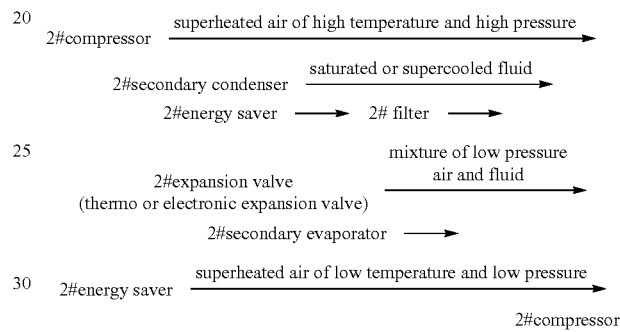

Explanation of the Air Flow of the Outer Air Condenser

External air→outer air condenser→cold air blower→external air

The invention adopts a heat balance process under a specific operating condition, with one (or two) corresponding condensers discharging air directly to an external environment (cooling) during operation process of four or more compressors, so as to achieve automatic temperature maintenance, in which the temperature is maintained within 40° C.~60° C. during the operation process. According to the heat absorption load based on material quantity and the system heat dissipation load, the temperature is controlled within a deviation of ±2° C., which is sufficient to meet the requirements for temperature control in sludge drying. By means of direct discharge to the external environment (cooling), a sealed drying process can be achieved, and there is no leakage of bad smells during the sludge drying process, and therefore it is not necessary to provide a deodorizing device. By separating circulation air volume and dehumidification air volume, the circulation air volume when separated from dehumidification air volume meets the requirements for high air volume in the early stage of wet sludge drying. The dehumidification air volume meets the requirements for high temperature and low humidity in the later stage of sludge drying. Such configurations to meet the air volume, air temperature and humidity requirements in different drying stages of sludge can shorten the sludge drying cycle and prevent dried dust of sludge. The external structure of the circulating fans and the blower (dehumidification blower) can meet the modular structural design requirements for sludge drying, and reduce the volume of the main structure of the dehumidifying heat pump. The device has compact structure, small floor space, small maintenance space, and a maintenance space that requires accessibility only from a front side is required, which can fully meet the modular structural requirements for sludge dryer. On the basis of dehumidification heat pump using existing air regenerative technology and two-stage refrigeration technology (triple-effect dehumidification heat pump), the overall dehumidification performance ratio of the sludge drying dehumidification heat pump is improved by providing four (or more) compressors.

The insulated housing 21 is provided with an instrument panel to monitor the operating conditions of each component during the process. The instrument panel can display parameters such as drying chamber temperature, humidity, outlet air temperature, power supply indication, compressor operation, fan operation, auxiliary fan operation, command configuration and operation, stop button, fan manual operation, and failure and reset of automatic button etc. A control box is arranged in a bracket and inside an outer casing; the control box can be provided with for example high voltage control devices for compressors, fans and blowers, and control function modules for dehumidification, refrigeration, heating and ventilation.

The regenerator 3 may be a plate-fin type regenerator, that is, a plate-fin type heat exchanging device. The plate-fin regenerator comprises partition plates, fins, seals, and distributor plates. A fin and a distributor plate are placed between adjacent partition plates to form an interlayer, and all interlayers are stacked and soldered into a one whole piece, and configured with a necessary head support. The fins may be straight fins, serrated fins, porous fins or corrugated fins.

The evaporators (secondary evaporator 4 and primary evaporator 5) are each being a finned tubular evaporator. The finned tubular evaporator comprises a base pipe and fins; the fins are mounted on the base pipe; the base pipe is made of a copper tube or an internally threaded copper tube; the fins are corrugated sheets of aluminum or copper materials, louvered fins or corrugated-louvered fins. The air condenser is a finned tubular heat exchanging device; the finned tubular heat exchanging device comprises a base pipe and fins; the fins are mounted on the base pipe; the base pipe is made of a copper tube or an internally threaded copper tube; the fins are corrugated sheets of aluminum or copper materials, louvered fins or corrugated-louvered fins. The bracket of the insulated housing is made of steel profile material, processed sheet metal or aluminum alloy profile material: the outer casing is a composite insulated board with thermal insulation properties, with a thickness of an insulation layer of the outer casing is not less than 25 mm, or the outer casing is made of a composite board, with inner layer of the composite board being a hot galvanized steel board, aluminum board or stainless steel board having good corrosion resistance. The partition 23 can be made of a galvanized sheet or an aluminum sheet which is excellent in corrosion resistance. A water receiving tray can be made of corrosion-resistant aluminum or stainless steel board: a condensed water draining pipe can be made of hot galvanized steel board or stainless steel board, and has a water trap design. The water condenser can be shell-and-tube type, soldered plate type or sleeve tube type, and its corrosion resistance is a factor to be considered in the process of water flow.

The description above illustrates only the more preferred embodiments of the present invention, and therefore should not limit the scope of the present invention. Obvious changes or modifications that achieve the same technical effect based on the teachings of the description and the scope of the present invention should also fall within the scope of protection of the present invention.

What is claimed is:

1. An automatic constant-temperature dehumidification device comprising two sets of dehumidifying heat pump assemblies; the two sets of dehumidifying heat pump assemblies comprise two refrigerant modules and an air module;
   each of the two refrigerant modules comprises a primary refrigeration module and a secondary refrigeration module; each of the primary refrigeration module and the secondary refrigeration module comprises a condenser, an evaporator, and a compressor; in each of the primary refrigeration module and the secondary refrigeration module of each of the two refrigerant modules, an outlet of the compressor is connected to an inlet of the corresponding condenser, an outlet of the condenser is connected to an inlet of the corresponding evaporator via an expansion valve, and an outlet of the evaporator is connected to the compressor; an air inlet duct of the air module is connected to a hot side of a regenerator disposed at each of the two refrigerant modules; the hot side of each regenerator is connected with the evaporator of the primary refrigeration module and the evaporator of the secondary refrigeration module of a corresponding refrigerant module via ventilation ducts; the evaporator of the primary refrigeration module and the evaporator of the secondary refrigeration module of each refrigerant module are also connected to a cold side of a corresponding regenerator disposed at a corresponding refrigerant module via ventilation ducts; and the cold side of each regenerator is also connected with the condenser of the secondary refrigeration module of a corresponding refrigerant module via ventilation ducts.

2. The automatic constant-temperature dehumidification device of claim 1, wherein the condenser of the primary refrigeration module of a first refrigerant module of the two refrigerant modules is a water condenser.

3. The automatic constant-temperature dehumidification device of claim 2, wherein the condenser of the primary refrigeration module of a second refrigerant module of the two refrigerant modules is provided with circulation fans for cooling by air and heat dissipation.

4. The automatic constant-temperature dehumidification device of claim 3, wherein a heat exchanger is provided between each evaporator and each corresponding compressor.

5. The automatic constant-temperature dehumidification device of claim 4, wherein a filter is provided between each heat exchanger and the corresponding expansion valve.

6. The automatic constant-temperature dehumidification device of claim 5, wherein the two sets of dehumidifying heat pump assemblies are disposed inside an insulated housing, and are respectively located at two sides of the insulated housing; an air mixing chamber and a drying chamber separated by a partition are disposed inside the insulating housing.

7. The automatic constant-temperature dehumidification device of claim 6, wherein the two regenerators are disposed in the middle of the insulated housing; and the air mixing chamber is defined between the two regenerators.

8. The automatic constant-temperature dehumidification device of claim 7, wherein a primary evaporator and a secondary evaporator being the evaporator of the primary refrigeration module of the first refrigerant module and the evaporator of the secondary refrigeration module of the first refrigerant module respectively are provided on one of two sides of a lower portion of the air mixing chamber; and another primary evaporator and another secondary evaporator being the evaporator of the primary refrigeration module of the second refrigerant module and the evaporator of the secondary refrigeration module of the second refrigerant module respectively are provided on another one of the two sides of a lower portion of the air mixing chamber.

9. The automatic constant-temperature dehumidification device of claim 8, wherein air filters each being corresponding to a corresponding set of the two sets of dehumidifying heat pump assemblies are disposed on the insulated housing; and an upper filter is disposed on each of the air filters.

10. The automatic constant-temperature dehumidification device of claim 1, wherein the condenser of the primary refrigeration module of a second refrigerant module of the two refrigerant modules is an air condenser.

11. The automatic constant-temperature dehumidification device of claim 10, wherein the condenser of the primary refrigeration module of a second refrigerant module of the two refrigerant modules is provided with circulation fans for cooling by air and heat dissipation.

12. The automatic constant-temperature dehumidification device of claim 11, wherein a heat exchanger is provided between each evaporator and each corresponding compressor.

13. The automatic constant-temperature dehumidification device of claim 12, wherein a filter is provided between each heat exchanger and the corresponding expansion valve.

14. The automatic constant-temperature dehumidification device of claim 13, wherein the two sets of dehumidifying heat pump assemblies are disposed inside an insulated housing, and are respectively located at two sides of the insulated housing; and an air mixing chamber and a drying chamber separated by a partition are disposed inside the heat insulating housing.

15. The automatic constant-temperature dehumidification device of claim 14, wherein the two regenerators are disposed in the middle of the insulated housing; and the air mixing chamber is defined between the two regenerators.

16. The automatic constant-temperature dehumidification device of claim 15, wherein a primary evaporator and a secondary evaporator being the evaporator of the primary refrigeration module of the first refrigerant module and the evaporator of the secondary refrigeration module of the first refrigerant module respectively are provided on one of two sides of a lower portion of the air mixing chamber; and another primary evaporator and another secondary evaporator being the evaporator of the primary refrigeration module of the second refrigerant module and the evaporator of the secondary refrigeration module of the second refrigerant module respectively are provided on another one of the two sides of a lower portion of the air mixing chamber.

17. The automatic constant-temperature dehumidification device of claim 16, wherein air filters each being corresponding to a corresponding set of the two sets of dehumidifying heat pump assemblies are disposed on the insulated housing; and an upper filter is disposed on each of the air filters.

* * * * *